(12) United States Patent
Hwang et al.

(10) Patent No.: US 8,952,967 B2
(45) Date of Patent: Feb. 10, 2015

(54) METHOD FOR INSERTING MOVING PICTURE INTO 3-DIMENSION SCREEN AND RECORD MEDIUM FOR THE SAME

(75) Inventors: Min-Jae Hwang, Seoul (KR); Hyun-Chang Lee, Gyeonggi-do (KR)

(73) Assignee: Intellectual Discovery Co., Ltd., Seoul (KR)

( * ) Notice: Subject to any disclaimer, the term of this patent is extended or adjusted under 35 U.S.C. 154(b) by 1181 days.

(21) Appl. No.: 11/993,458

(22) PCT Filed: Jun. 23, 2006

(86) PCT No.: PCT/KR2006/002435
§ 371 (c)(1),
(2), (4) Date: Dec. 20, 2007

(87) PCT Pub. No.: WO2006/137713
PCT Pub. Date: Dec. 28, 2006

(65) Prior Publication Data
US 2010/0156932 A1   Jun. 24, 2010

(30) Foreign Application Priority Data

Jun. 24, 2005   (KR) .................. 10-2005-0055261

(51) Int. Cl.
*G06T 13/00*   (2011.01)
*G06T 15/00*   (2011.01)
*G06T 15/04*   (2011.01)

(52) U.S. Cl.
CPC ..................... *G06T 15/04* (2013.01)
USPC ........................................ 345/473; 345/419

(58) Field of Classification Search
USPC .................. 345/419, 582, 629, 638; 715/757; 382/245
See application file for complete search history.

(56) References Cited

U.S. PATENT DOCUMENTS 4,935,879 A * 6/1990 Ueda ............................. 345/552
4,970,593 A * 11/1990 Cantrell ....................... 348/629

(Continued)

FOREIGN PATENT DOCUMENTS

JP    08-161511      6/1996
JP    2001-246170    9/2001

(Continued)

OTHER PUBLICATIONS

Nancy Ellen Kho, "Commanimation: A Speech-Controlled Animation System", Masters Thesis, Massachusetts institute of Technology, May 20, 2004, 67 pages.*

(Continued)

*Primary Examiner* — Daniel Hajnik
(74) *Attorney, Agent, or Firm* — H.C. Park & Associates, PLC

(57) ABSTRACT

Disclosed is a method and a computer readable recording medium for inserting moving picture into 3D picture. The disclosed method comprises the steps of (a) Receiving a moving picture data from a server; (b) calling a player to play the moving picture data; (c) drawing a frame image of the moving picture played by the player on a predetermined moving picture drawing memory area at a predetermined time interval; (d) setting a texture for the frame image stored in the moving picture drawing memory area, the texture including insertion coordinate information of 3D picture where the texture is inserted; (e) rendering the texture corresponding to the frame image on the 3D picture according to texture setting information.

14 Claims, 8 Drawing Sheets

(56) References Cited

U.S. PATENT DOCUMENTS

| | | | | |
|---|---|---|---|---|
| 5,214,511 | A * | 5/1993 | Tanaka | 348/580 |
| 5,261,041 | A * | 11/1993 | Susman | 345/473 |
| 5,369,736 | A * | 11/1994 | Kato et al. | 345/582 |
| 5,546,518 | A * | 8/1996 | Blossom et al. | 345/473 |
| 5,696,892 | A * | 12/1997 | Redmann et al. | 345/582 |
| 5,754,170 | A * | 5/1998 | Ranganathan | 345/558 |
| 5,856,829 | A * | 1/1999 | Gray et al. | 345/419 |
| 6,021,229 | A * | 2/2000 | Takashima et al. | 382/285 |
| 6,289,163 | B1 * | 9/2001 | Wang | 386/290 |
| 6,323,877 | B1 * | 11/2001 | Katoh et al. | 345/638 |
| 6,373,482 | B1 * | 4/2002 | Migdel et al. | 345/419 |
| 6,434,277 | B1 * | 8/2002 | Yamada et al. | 382/285 |
| 6,478,680 | B1 * | 11/2002 | Yoshioka et al. | 463/43 |
| 6,570,563 | B1 * | 5/2003 | Honda | 345/419 |
| 6,570,575 | B1 * | 5/2003 | Wittenbrink | 345/592 |
| 6,583,793 | B1 * | 6/2003 | Gould et al. | 345/679 |
| 6,606,097 | B1 * | 8/2003 | Fossum | 345/501 |
| 6,621,939 | B1 * | 9/2003 | Negishi et al. | 382/291 |
| 6,650,327 | B1 * | 11/2003 | Airey et al. | 345/520 |
| 6,795,972 | B2 * | 9/2004 | Rovira | 725/40 |
| 6,954,728 | B1 * | 10/2005 | Kusumoto et al. | 705/14.4 |
| 7,230,653 | B1 * | 6/2007 | Overton et al. | 348/584 |
| 7,786,999 | B1 * | 8/2010 | Reid | 345/581 |
| 2001/0034661 | A1 * | 10/2001 | Ferreira | 705/26 |
| 2002/0038456 | A1 * | 3/2002 | Hansen et al. | 725/46 |
| 2002/0198962 | A1 * | 12/2002 | Horn et al. | 709/218 |
| 2003/0063072 | A1 * | 4/2003 | Brandenberg et al. | 345/173 |
| 2004/0015608 | A1 * | 1/2004 | Ellis et al. | 709/246 |
| 2005/0022139 | A1 * | 1/2005 | Gettman et al. | 715/850 |
| 2005/0030309 | A1 * | 2/2005 | Gettman et al. | 345/419 |
| 2005/0063596 | A1 * | 3/2005 | Yomdin et al. | 382/232 |
| 2005/0104881 | A1 * | 5/2005 | Yoshida et al. | 345/419 |
| 2005/0183041 | A1 * | 8/2005 | Chiu et al. | 715/850 |
| 2005/0259968 | A1 * | 11/2005 | Tsumagari et al. | 386/95 |
| 2005/0267798 | A1 * | 12/2005 | Panara | 705/14 |
| 2005/0289590 | A1 * | 12/2005 | Cheok et al. | 725/37 |
| 2006/0080702 | A1 * | 4/2006 | Diez et al. | 725/30 |
| 2006/0244638 | A1 * | 11/2006 | Lettau | 340/995.1 |

FOREIGN PATENT DOCUMENTS

| | | |
|---|---|---|
| KR | 2000-37114 | 7/2000 |
| KR | 2002-7892 | 1/2002 |

OTHER PUBLICATIONS

JR Young, "3-D Virtual Environments as Melodrama: Emotion, Class, and Domesticity in the Virtual World of Cybertown", Apr. 25, 2001, Masters Thesis, Georgetown University, 102 pages.*

Anonymous, "Adobe Flash Trademark Guidelines", Adobe website document, Feb. 7, 2008, 9 pages, retrieved from: http://www.adobe.com/misc/pdfs/flash_3rd_party_trademark_guidelines_020708.pdf.*

* cited by examiner

METHOD FOR INSERTING MOVING PICTURE INTO 3-DIMENSION SCREEN AND RECORD MEDIUM FOR THE SAME

CROSS REFERENCE TO RELATED APPLICATIONS

This application is a U.S. National Phase Application of International Application PCT Application No. PCT/KR2006/002435 filed on Jun. 23, 2006, which claims the benefit of priority from Korean Patent Application No. 10-2005-0055261 filed on Jun. 24, 2005. The disclosures of International Application PCT Application No. PCT/KR2006/002435 and Korean Patent Application No. 10-2005-0055261 are incorporated herein by reference.

FIELD OF THE INVENTION

The present invention relates to a method and a computer readable medium for inserting moving picture into a 3D picture.

BACKGROUND OF THE INVENTION

Conventionally, 3D graphic in game was used in very limited kind of game such as flight simulation game and only wire fame image was used to display 3D graphic. However, recently, 3D engine has progressed and capability of processor improved tremendously and shading, texturing and lightening became possible and 3D graphic is applied to many kinds game. Further, with progress of the 3D engine, other softwares associated with graphic also provides 3D graphic.

3D graphic provides feel of material to the 2D image for 3 dimensional effect. In 3D graphic, different image is provided depending on user's view point, and therefore, 3D graphic can provide sense of the real as if users see objects in real world.

Recently, as the number of game users increases, advertisement or other information is being tried to be inserted in the game. The advertisement or other information was inserted in game in the form of still image and moving picture was not inserted in game.

Although 3D graphic can provide sense of the real, it was difficult to insert image object to the 3D graphic if the image object not 3D object.

Especially, if the object to be inserted into the 3D graphic is moving picture, the moving picture could not be inserted into the 3D graphic without pre-process for the moving picture.

The moving picture needs to be updated by a predetermined scheduling algorithm, and conventionally, the advertisement moving picture provided from a server could not be inserted into 3D graphic picture in real time.

Further, users also request that user interface is provided in the form of moving picture such as Flash®. However, it was also difficult to provide user interface in the form of moving picture in 3D graphic.

DETAILED DESCRIPTION OF THE INVENTION

Technical Objects

In order to solve above mentioned problems, the present invention provides a method and a computer readable medium for inserting moving picture into 3D picture without pre-process for the moving picture in server.

Further, the present invention provides a method and a computer readable medium for inserting various kinds of moving picture advertisement data into predetermined area of 3D game in real time.

Further, the present invention provides a method and a computer readable medium that can provide moving picture user interface for 3D picture.

Technical Solution

According to an aspect of the present invention, there is provided a method for inserting a moving picture into a 3D picture, comprising the steps of: (a) Receiving a moving picture data from a server; (b) calling a player to play the moving picture data; (c) drawing a frame capture image of the moving picture played by the player on a predetermined moving picture drawing memory area at a predetermined time interval; (d) setting a texture for the frame image stored in the moving picture drawing memory area, the texture including insertion coordinate information of 3D picture where the texture is inserted; (e) rendering the texture corresponding to the frame capture image on the 3D picture according to texture setting information.

The moving picture data includes an advertisement data or a moving picture data to be inserted into a user interface.

The advertisement data is transmitted from the server by a predetermined scheduling algorithm.

The step (c) comprises the step of: requesting the player to draw the frame capture image; and the player's drawing the requested frame capture image on the drawing memory area.

The frame capture image is captured at the predetermined time interval when the player plays the moving picture data.

The predetermined time interval corresponds to time interval at which the 3D picture is updated.

The step (d) comprises the steps of: loading the texture to be inserted into the 3D picture; generating a texture stage; generating a fixed point buffer and filling the fixed point buffer.

The texture is loaded by indicating the memory area where the frame capture image is drawn.

The above method may further comprise the step of transforming a coordinate information associated with a user event, on occurrence of the user event, into moving picture coordinate information in the player if the moving picture is Flash® type moving picture, and the player receives the moving picture coordinate information and performs a predetermined process associated with the user event of the moving picture coordinate information.

According to another aspect of the present invention, there is provided a computer readable recording medium for executing a method for inserting moving picture into 3D picture, the method comprising the steps of (a) when a moving picture is transmitted form a server, calling a moving picture player and requesting the moving picture player to play the transmitted moving picture; (b) drawing a frame capture image of the moving picture on a predetermined moving picture drawing memory through communication with the moving picture player at a predetermined time interval; (c) setting a texture for the frame capture image stored in the moving picture drawing memory area, the texture including insertion coordinate information of 3D picture where the texture is inserted; (d) setting a rendering information including a coordinate transformation matrix so that a 3D engine renders the texture of the frame capture image on a predetermined location of the 3D picture according to the texture setting information.

MODE OF INVENTION

Hereinafter, the preferred embodiment of the present invention will be descried with reference to accompanying drawings.

Figure 1:
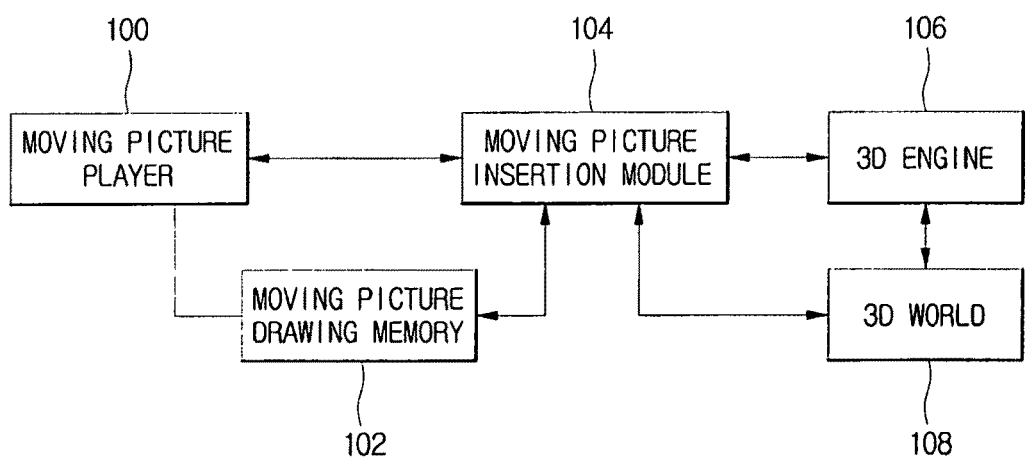
FIG. 1 is a module configuration for inserting moving picture into 3D picture according to a preferred embodiment of the present invention.

FIG. 1 is module configuration for inserting moving picture into 3D picture according to a preferred embodiment of the present invention.

Referring to FIG. 1, The module configuration for inserting moving picture may comprise a moving picture player 100, a moving picture drawing memory 102, a moving picture insertion module 104, a 3D engine 106 and a 3D world 108.

The present invention is for inserting moving picture into 3D picture such as picture of 3D game modules in order for achieving this may be implemented by softwares or by hardwares such as card or chip. The module of FIG. 1 may be installed in a user client.

In the present invention, the moving picture inserted into 3D picture may include moving picture file such as AVI, MEP, ASF or Flash® moving picture in the form of SWF.

Further, besides above mentioned moving picture types, animation generated by document file can also be inserted. For example, Power Point document can generate various animations, and the animations generated by the document can be inserted though communication with document application.

In FIG. 1, the moving picture player 100 plays moving picture file provided from a server(not shown). According to the present invention, the server transmits moving picture file to be inserted into a 3D picture to a user client and the moving picture player 100 plays the moving picture file provided from the server. The server may transmit the moving picture file when a predetermined event occurs to insert the moving picture into 3D picture. Otherwise, the server may transmit the moving picture file previously, and the moving picture player may play the stored moving picture file when a predetermined event occurs to insert the moving picture into 3D picture.

The moving picture player 100 plays various kinds of moving picture, if necessary, plurality of moving picture players can be prepared. In order to play AVI, MPEG, etc., Windows Media Player can be used. In order to play SWF type Flash® file, the Flash® player of Macromedia can be used.

The moving picture player draws the played moving picture on a predetermined memory area. According to an embodiment of the present invention, the moving picture player may draw frame image captured by the moving picture player on moving picture drawing memory. Alternatively, the moving picture player does not capture the frame image, and the moving picture insertion module 104 may capture the frame image and draw the captured frame image of the moving picture on the moving picture drawing memory 102. Herein, the drawing may include drawing operation of the moving picture that draws frame image on the drawing memory using drawing function and storage operation that stores the frame capture image on the moving picture drawing memory. According to an embodiment of the present invention, the moving picture drawing memory 102 may be memory DC(Device Context).

The moving picture insertion module 104 controls play of moving picture data and provides the played moving picture to the 3D world 108 so that the played moving picture is inserted into the 3D picture.

The moving picture insertion module 104 may be program module which is included in 3D game or other 3D graphic applications. Otherwise, the moving picture insertion module 104 may be independent application program for inserting moving picture into 3D game or 3D graphic application.

For example, the moving picture data inserted by the moving picture insertion module 104 may be moving picture advertisement. If moving picture is inserted into predetermined area such as electric sign board of 3D game and the inserted moving picture advertisement is played, the effect of the advertisement can be maximized compared with the case that still image advertisement is inserted into game.

For another example, the moving picture data may be used as user interface of the 3D game. In 3D game, the user interface such as icon is displayed in the form of 2D graphic. However, according to the present invention, user interface implemented by Flash®, etc. can be inserted into user interface area and more splendid and active user interface can be provided. Especially, as the flash moving picture can intercommunicate with user, the Flash® moving picture can be used as user interface effectively.

The moving picture insertion module 104 provides the moving picture image of a specified frame which is drawn on the moving picture drawing memory 102 in the form of texture to the 3D world 108 and the moving picture played by the moving picture player can be inserted into a predetermined area of 3D picture.

More detailed process for the moving picture insertion module 104 to set texture and insert the texture into the 3D world is described referring to another figures.

The texture is a 2-dimensional image mapping on geometry of 3D picture. As described above, in order to transform moving picture into 2D image, the moving picture player may provide captured frame image. Otherwise, the moving picture insertion module 104 may perform capture operation.

According to a preferred embodiment of the present invention, the interval that the moving picture insertion module 104 provides texture of moving picture is same as interval that 3D world data is updated. For example, if 3D world is updated 30 times in a second, the texture corresponding to the moving picture is also provided 30 times in a second so that texture corresponding to moving picture is reflected in the 3D world 108 whenever 3D world is updated.

The 3D engine 106 operates 3D graphic related program such as 3D game and manages application and data. The 3D engine assists design of application and application operation.

In case of 3D game, the 3D engine may be included in the game engine. The 3D engine controls physical movement of objects in 3D circumstance and performs 3D graphic rendering through communication with application.

Although it is not shown in FIG. 1, 3D graphic API(Application Program Interface) such as DireX or openGL can be used for effective 3D graphic implementation.

The 3D world 108 refers to memory area where 3D picture implemented by 3D engine and 3D application is displayed. The 3D world 108 is updated by predetermined time interval, the 3D engine 106 renders the 3D graphic of the 3D world on a user display device. As described above, moving picture which is transformed into texture is inserted into predetermined area of the 3D world.

In general, whole 3D picture is drawn in 3D world 108, and the 3D engine displays only the picture part corresponding to user's visual field on the user display device.

By above mentioned module configuration, server may just transmit moving picture advertisement without additional process, the transmitted moving picture advertisement can be displayed in predetermined area of the 3D game in real time. Further, more active and realistic user interface can be provided using Flash®, and the user interface graphic can be replaced without additional patch process.

Figure 2:
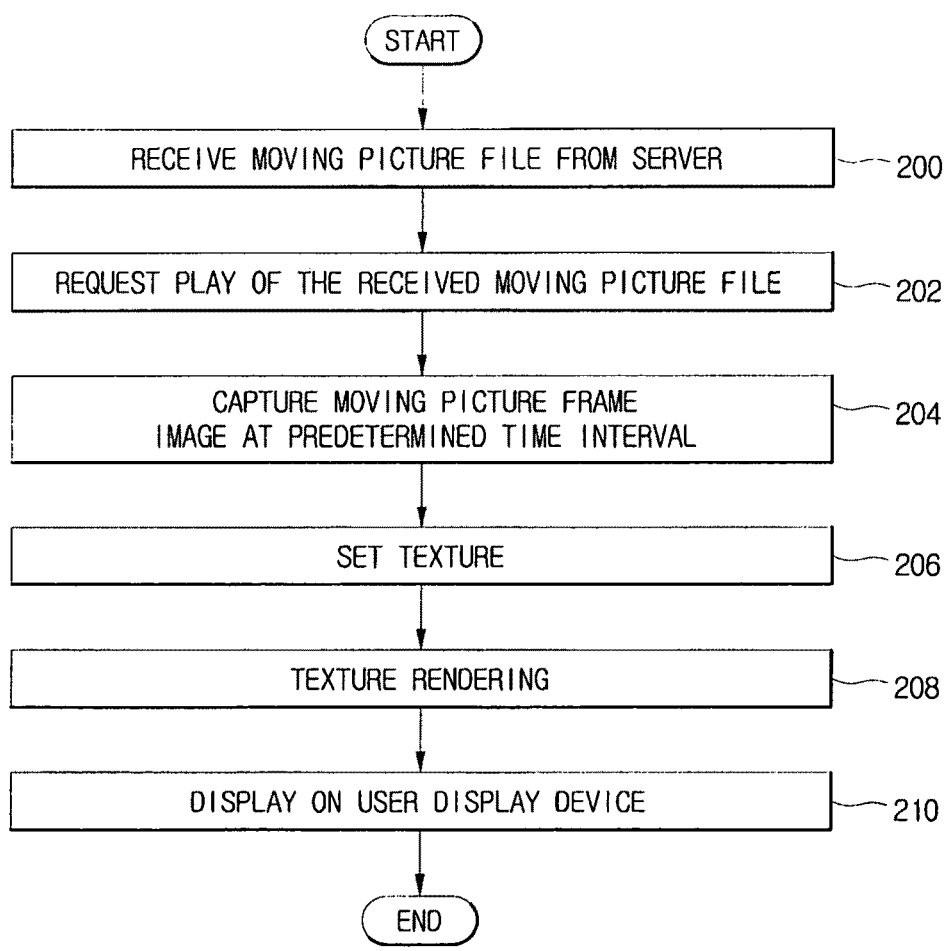
FIG. 2 is a flow chart showing method for inserting moving picture into 3D picture according to a preferred embodiment of the present invention.

FIG. 2 is a flow chart showing method for inserting moving picture into 3D picture according to a preferred embodiment of the present invention.

Referring to FIG. 2, firstly, process for receiving moving picture file is performed in step 200. When the moving picture file is advertisement, the server may transmit various advertisements according to predetermined scheduling algorithm.

When the moving picture file is received, the moving picture insertion module 104 requests the moving picture player 100 to play the received moving picture file in step 200. The moving picture insertion module 104 checks type of the moving picture file and requests the moving picture player corresponding to the determined type. (For example, if the moving picture file type is SWF, the moving picture insertion module 104 requests the macromedia Flash® player to play the SWF type file).

The moving picture insertion module 104 provides information on memory area where moving picture is played to the moving picture player 100, and the moving picture player plays the moving picture file on the memory area.

After the moving picture is played, frame image of the moving picture is captured at predetermined time interval in step 204. As described above, the moving picture player may store captured data on the moving picture drawing memory, otherwise, the moving picture insertion module may capture the moving picture being played. Especially, when moving picture is played by the Flash® player, frame image of the moving picture can be drawn on a memory area using function draw( ).

As described above, frame image of the moving picture is preferred to be captured according to 3D world update interval.

The moving picture insertion module 104 sets texture for captured image in step 206. The moving picture insertion module 104 sets fixed point having texture coordinate and performs texture generation process including stage setting. For example, when moving picture is inserted in a TV object of 3D picture, the TV object is set as geometry and the moving picture insertion module 104 sets texture coordinate and texture color.

If texture corresponding to the captured image is set, the texture is rendered on a geometry in step 208. The texture is rendered on a geometry based on the texture setting information. In rendering, texture coordinate index is transformed into texture coordinate. The capture image is rendered based on shape of geometry. For example, if geometry is plane such as TV, the image is rendered on a plane. If geometry is rounded track, the texture is rendered on a rounded track.

Figure 7:
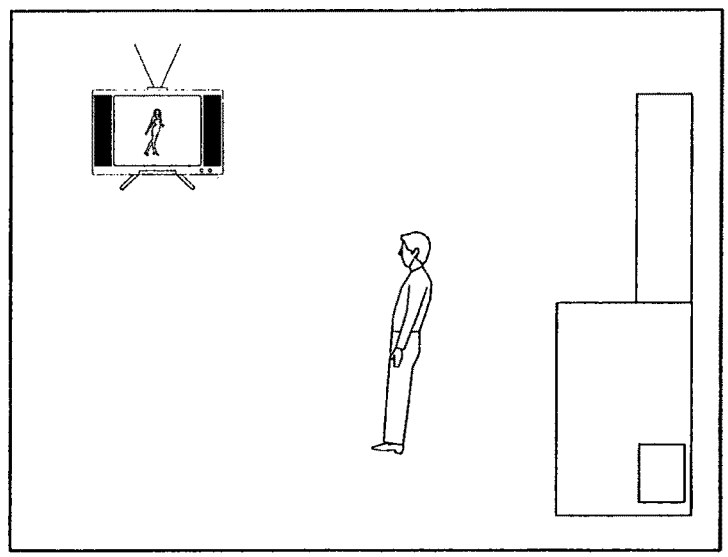
FIG. 7 and FIG. 8 are examples of rendering moving picture into a 3D picture.
Figure 8:
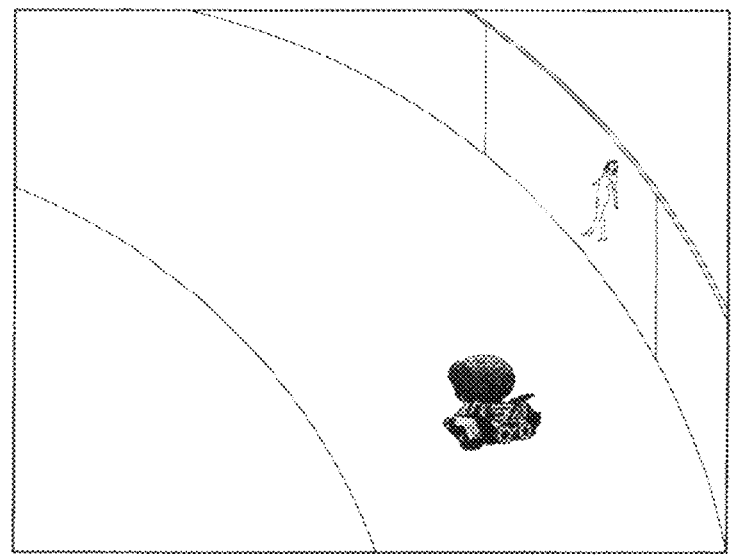

FIG. 7 and FIG. 8 is an example of rendering moving picture into a 3D picture.

As shown in FIG. 7 and FIG. 8, the moving picture is inserted into predetermined area such as TV or track of 3D picture, the shape of inserted moving picture is associated with the shape of geometry.

The 3D engine displays graphic part related with user's view field among graphic drawn in 3D world on user display device in step 210, and user can see the inserted moving picture in various angles.

Although it is not shown in FIG. 2, if the moving picture data is Flash® data, the user can input request information to the inserted moving picture. The Flash® moving picture includes action script and performs predetermined process in response to user event such as mouse event. According to the present invention, the input of the request information to the flash moving picture inserted to the 3D picture.

The 3D engine or other application operation engine detects if user event such as mouse event occurs on a specified area of the Flash® moving picture displayed in the 3D picture. If the user event occurs, the 3D engine or other application operation engine transforms coordinate of the user event into coordinate in the Flash® player and provides the transformed coordinate to the flash Flash® player.

The Flash® player performs predetermined process for the user event of the coordinate, and the Flash® moving picture changed by the performed process is displayed on the 3D picture by the process of the FIG. 2.

Therefore, the flash moving picture can be useful when the Flash® moving picture is inserted as user interface.

Figure 3:
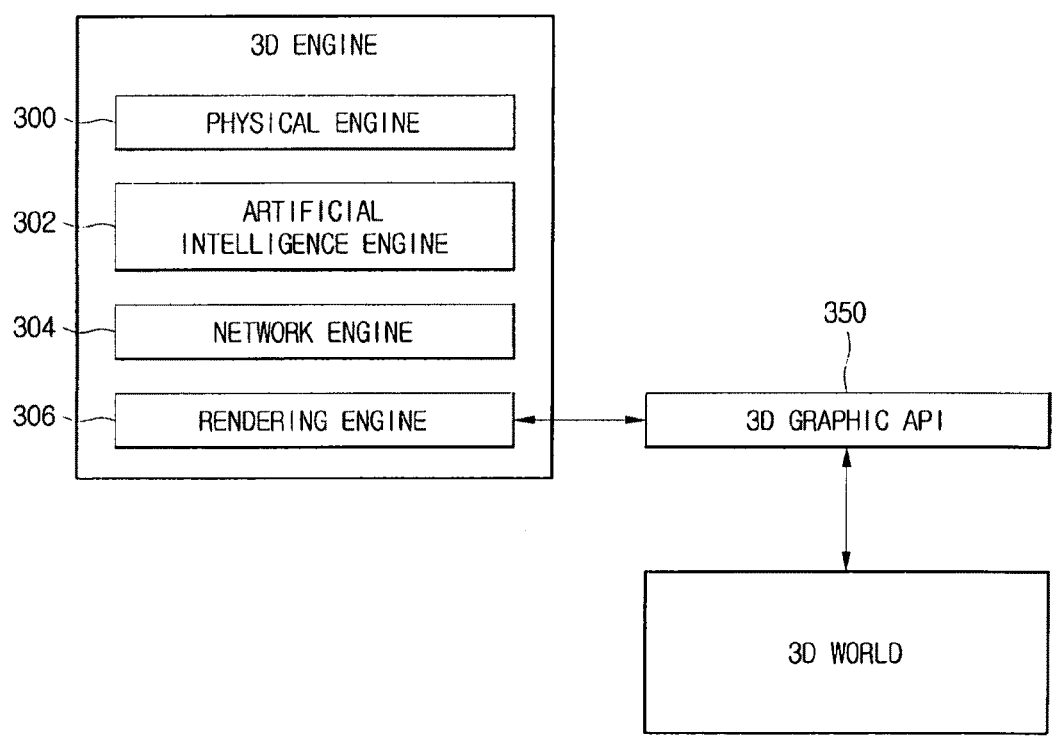
FIG. 3 is a block diagram of 3D engine according to a preferred embodiment of the present invention.

FIG. 3 is a block diagram of 3D engine according to a preferred embodiment of the present invention.

Referring to FIG. 3, the 3D engine used in the present invention includes a physical engine 300, an artificial intelligence engine 302, a network engine 304, and a rendering engine 306.

The physical engine 300 expresses collision effect between objects and special effect, etc. For example, when a ball is blocked by wall, the ball does not go anymore and is bounded by resilient power. Above mentioned operation is controlled by the physical engine 300. Further, special effect by gun or sword, etc. can also be controlled by the physical engine. The physical engine is based on physics and the most basic law is Newton dynamics law. In 3D game, realistic motion of player character is controlled by physical engine 300.

The artificial intelligence engine 302 controls character or other objects to operate intelligently by predetermined algorithm. For artificial intelligence, DT(Decison Tree) technology, FuSM(Fuzzy State Machine) technology, FSM(Finite State Machine) technology, script language, or rule based system can be used. Action of NPC(Non-Player Character) or operation that objects moves by the shortest path is controlled by the artificial intelligence engine.

The network engine is mainly used in online 3D game, and the network engine is not necessary when game does not require network communication. The network engine 304 transmits information generated by users who connected to online 3D game. In order to transmit information generated by users, P2P, client-server system, hybrid system and large capacity distributed server system can be used.

The rendering engine 306 transforms 3 dimensional geometric information into 2 dimensional image and displays the image on user display device. In the present invention, the rendering engine inserts the moving picture into geometry and displays it. The 3D picture data includes fixed point coordinate of object, texture fixed point coordinate and diffuse value, and the rendering engine displays the information on screen.

The rendering engine may perform rendering independently, otherwise, the rendering engine may cooperate with 3D graphic API (Application Program Interface) 350 such as DirectX and openGL. By using 3D graphic API 350, faster 3D graphic data processing is possible.

Figure 4:
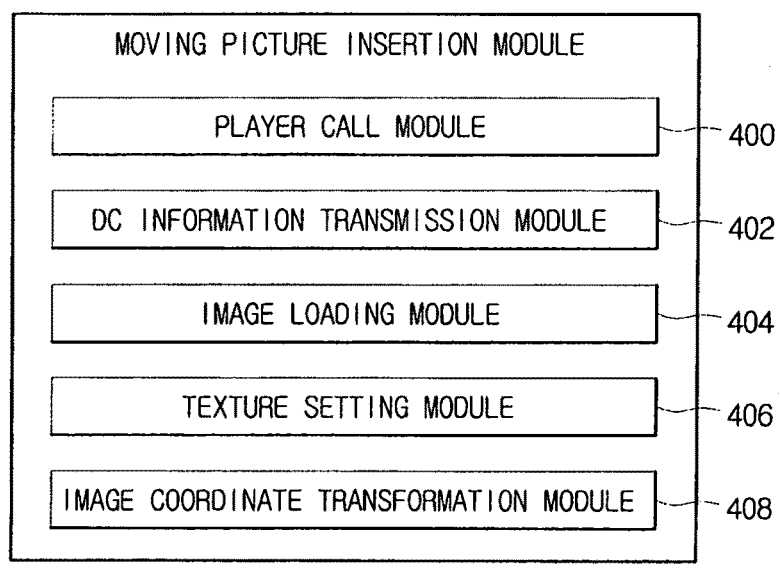
FIG. 4 is a block diagram of moving picture insertion module according to a preferred embodiment of the present invention.

FIG. 4 is a block diagram of moving picture insertion module according to a preferred embodiment of the present invention.

Referring to FIG. 4, the moving picture insertion module according to a preferred embodiment of the present invention may comprise a player call module 400, a DC(Device Context) information transmission module 402, an image loading module 404, a texture setting module 406 and image coordinate transformation module 408.

In FIG. 4, module configuration for the case that moving picture player draws frame image on moving picture drawing memory is illustrated. However, as described above, the moving picture insertion module may capture the moving picture, at this case, moving picture capture module can be further included.

In FIG. 4, the player call module 400 calls a moving picture player when moving picture file is transmitted from server. As described above, the player call module 400 determines type of moving picture file and calls the moving picture player corresponding to moving picture file type and provides moving picture file information to play.

The DC information transmission module 402 provides information on memory area where frame image data is to be drawn and function for image drawing to the called moving picture player. According to an embodiment of the present invention, the DC information transmission module 402 requests generation of DC information through communication with 3D graphic API and provides the generated DC information to the moving picture player. For example, if the moving picture from the server is Flash® type, the DC information transmission module 402 requests the 3D graphic API to generate DC information. The DC information transmission module 402 provides memory area information, function, frame information. etc. to the moving picture player so that the Flash® player draws frame image on a predetermined memory area. Of course, only a portion of a frame image can be drawn on a predetermined memory area. At this case, type of image file is preferred to be bitmap.

The image loading module 404 inserts the image drawn on the moving picture drawing memory to the 3D picture. The image loading process can also be performed by texture setting module 406. As described above, the image is preferred to be loaded at the interval where the 3D world is updated.

The texture setting module 406 performs texture setting so that the loaded image is inserted into a predetermined area of the 3D picture. The texture setting module 406 sets geometry coordinate at which texture is covered and texture coordinate. The rendering is performed according to texture setting information. More detailed texture setting process is described referring to FIG. 5.

The image coordinate transformation module 408 performs coordinate transformation for the image drawn on the moving picture drawing memory if coordinate transformation is necessary. The moving picture image is used as the texture and the texture coordinate has range of 0.0~1.0. Coordinate value of some kinds of image file is different from coordinate value of texture, and the image coordinate transformation module 408 performs transformation at this case. Because the image coordinate transformation is well-known technology, detailed description for the image coordinate transformation would be omitted.

Figure 5:
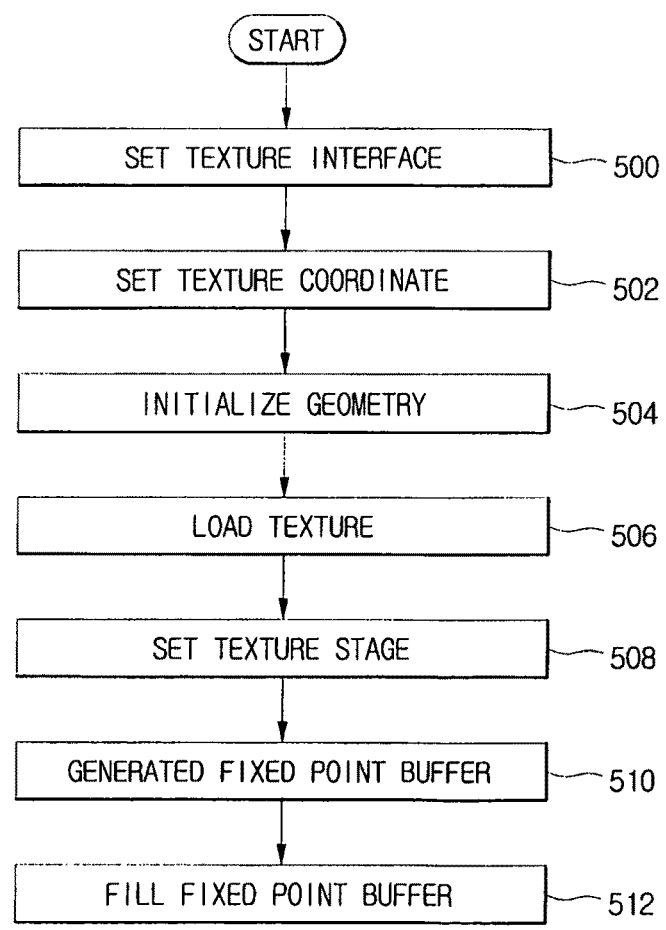
FIG. 5 is a flow chart for setting texture according to a preferred embodiment of the present invention.

FIG. 5 is a flow chart for setting texture according to a preferred embodiment of the present invention.

Referring to FIG. 5, texture interface is set firstly in step 500. The texture interface setting process is declaring texture parameters. When 3D graphic interface is used, the texture interface may be set as follows using C++ language.

LPDIRECT3DTEXTURE9 texture=NULL

After the texture interface is set, the texture coordinate is set in step 502. The coordinate may include 3 dimensional coordinate of area where the texture is to be inserted and 2 dimensional coordinate of the texture itself. The texture coordinate may be set in the form of structure of C++ language and one example is as follows.

```
struct CUSTOMVERTEX
{
    D3DXVECTOR3 position;
    D3DCPLPR color;
    FLOAT tu, tv;
}
```

After the texture coordinate is set, geometry where texture is covered is initialized in step 504.

After the geometry is set, texture to be covered on the geometry is loaded in step 506. The texture may be loaded using file path information. However, according to the present invention, it is preferable that texture is loaded using indication information of memory area where image is drawn. General D3DXcreateTexture function can be used for loading texture.

After texture is loaded, texture stage is set in step 508. In the texture stage setting process, brightness of texture color, brightness of surrounding background and so on are set. In setting stage, modulate function which combines texture color with the surrounding background color can be used.

After setting stage, a fixed point buffer for geometry where texture is covered is generated in step 510. The fixed point buffer can be generated using CreateVertexBuffer. The generated fixed point buffer is filled with 2 dimensional u,v coordinate values in step 512.

Figure 6:
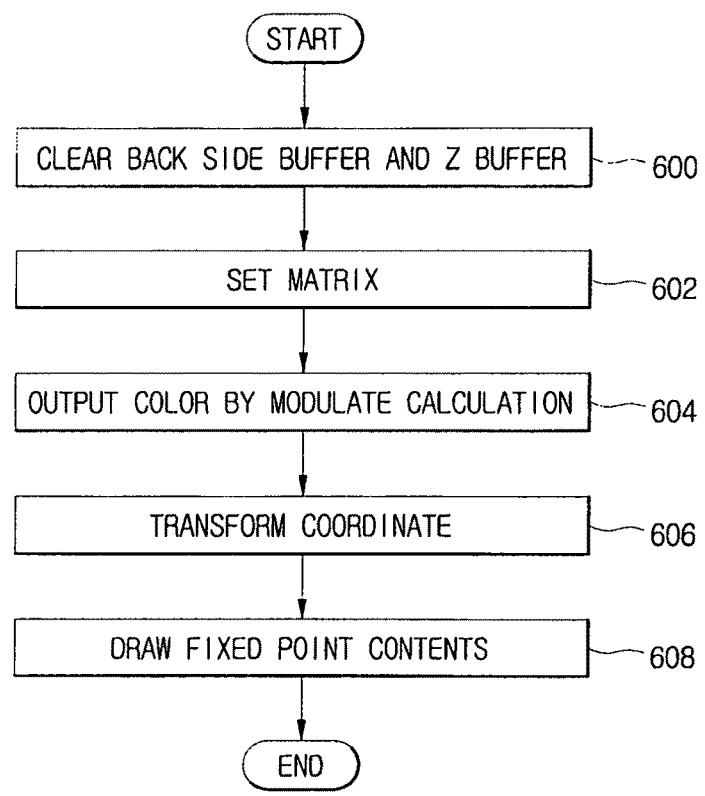
FIG. 6 is a flow chart for rendering the texture according to a preferred embodiment of the present invention.

FIG. 6 is a flow chart for rendering the texture according to a preferred embodiment of the present invention.

Referring to FIG. 6, in order to render 2 dimensional texture, a back side buffer and a Z buffer are cleared in step 600.

When the back side buffer and the Z buffer are cleared, a matrix used in texture transformation is set in step 602. The matrix used in texture transformation may include world matrix projection matrix and view matrix, etc.

When the matrix used in texture transformation is set, colors are combined through modulate calculation, per step 604, according to the stage setting information. Generally, color of the texture and color of fixed point can be combined.

The matrix set in step 602 is used as transmission factor of texture coordinate index and 3 dimensional texture coordinate index is transformed into u,v texture coordinate in step 606. If the coordinate is transformed, rendering process is completed by drawing contents of the fixed point buffer in step 608.

As used in this application, the term "module" is intended to refer to, but is not limited to, a software or hardware component, which performs certain tasks. A module or component may advantageously be configured to reside on the addressable storage medium and configured to execute on one or more processors. Thus, a module or component may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow. The scope of the disclosure is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims.

INDUSTRIAL APPLICABILITY

As described above, according to the preferred embodiment of the present invention, moving picture data can be inserted into 3D picture without pre-process for the moving picture in server.

Further, according to the preferred embodiment of the present invention, various kinds of moving picture advertisement data can be inserted into predetermined area of 3D game in real time.

The invention claimed is:

1. A computer-implemented method for inserting a non-three-dimensional (3-D) moving picture into a three-dimensional (3-D) space, the method comprising:
   receiving moving picture data from a server;
   calling a moving picture player to play the moving picture data;
   capturing frame image data of the moving picture data by using the moving picture player;
   drawing the captured frame image data on a memory area at a time interval by using the moving picture player;
   setting a texture coordinate of the captured frame image data corresponding to coordinate information of 3-D picture data;
   loading a texture to be inserted into the three-dimensional (3-D) space, wherein the texture is loaded by using indication information of the memory area where the frame capture image is drawn;
   real-time rendering of the texture of the captured frame image data to a 3-D coordinate area of the 3-D space cooperating with a 3-D graphic application program interface (API); and
   transforming coordinate information associated with an occurrence of a user event within the moving picture player into the coordinate information of the moving picture player to change the moving picture in response to the user event,
   wherein 3-D graphic API generating device context (DC) information is provided to the moving picture player.

2. The method of claim 1, wherein the moving picture data comprises an advertisement data.

3. The method of claim 2, wherein the advertisement data is transmitted by a scheduling algorithm.

4. The method of claim 1, wherein the texture coordinate comprises insertion coordinate information where the texture is to be inserted, and wherein the captured frame image data is inserted into a 3-D coordinate area of the 3-D space using the same time interval of the 3-D space being updated.

5. The method of claim 1, further comprising:
   generating a texture stage;
   generating a fixed point buffer; and
   filling the fixed point buffer.

6. The method of claim 1, further comprising:
   mapping the data corresponding to the captured frame image data on the 3-D space according to the texture coordinate.

7. A non-transitory computer readable recording medium comprising an executable program, which when executed by a processor, performs a method, the method comprising:
   receiving moving picture data from a server;
   calling a moving picture player to play the moving picture data;
   capturing frame image data of the moving picture data by using the moving picture player;
   drawing the captured frame image data on a memory area at a time interval by using the moving picture player;
   setting a texture coordinate of the captured frame image data corresponding to coordinate information of 3-D picture data;
   loading a texture to be inserted into the three-dimensional (3-D) space, wherein the texture is loaded by using indication information of the memory area where the frame capture image is drawn;
   real-time rendering of the texture of the captured frame image data to a 3-D coordinate area of the 3-D space cooperating with a 3-D graphic API; and
   transforming coordinate information associated with an occurrence of a user event within the moving picture player into the coordinate information of the moving picture player to change the moving picture in response to the user event,
   wherein 3-D graphic API generating device context (DC) information is provided to the moving picture player.

8. A method comprising:
   receiving moving picture data from a server;
   calling a moving picture player to play the moving picture data;
   capturing frame image data of the moving picture data by using the moving picture player;
   drawing the captured frame image data on a memory area at a time interval by using the moving picture player;
   determining coordinate information of a texture of the captured frame image data corresponding to coordinate information of 3-D picture data, the coordinate information comprising insertion coordinate information where the texture is to be inserted;

loading a texture to be inserted into the three-dimensional (3-D) space, wherein the texture is loaded by using indication information of the memory area where the frame capture image is drawn;

real-time rendering of the texture of the captured frame image data to a 3-D coordinate area of the 3-D space cooperating with a 3-D graphic API; and transforming coordinate information associated with an occurrence of a user event within the moving picture player into the coordinate information of the moving picture player to change the moving picture in response to the user event, wherein 3-D graphic API generating device context (DC) information is provided to the moving picture player.

9. The method of claim 8, wherein the moving picture data comprises an advertisement data.

10. The method of claim 8, wherein the moving picture data is captured at a time interval.

11. The method of claim 8, wherein the captured frame image data is inserted into a 3-D coordinate area using a time interval corresponding to the time at which a 3-D space is updated.

12. A server comprising a processor for inserting a non-three-dimensional (3-D) moving picture into a three-dimensional space, the apparatus comprising:
   a memory;
   a moving picture playing module, executable by the processor, configured to:
      call a moving picture player to play the moving picture data,
      play and capture frame image data of moving picture data by using the moving picture player,
      draw the captured frame image data on an area of the memory at a time interval by using the moving picture player, and
      determine coordinate information of a texture of the captured frame image data corresponding to coordinate information of 3-D picture data, the coordinate information comprising insertion coordinate information where the texture is to be inserted by using indication information of the memory area where the frame capture image is drawn;
   a moving picture insertion module, executable by the processor, configured to render the texture of the captured frame image data to a 3-D coordinate area of the 3-D space cooperating with a 3-D graphic API; and
   a 3-D engine, executable by the processor, configured to:
      display graphic part related with user's view field among graphic drawn in 3D world on user display device, and
      transform coordinate information associated with an occurrence of a user event within the moving picture player into the coordinate information of the moving picture player to change the moving picture in response to the user event,
   wherein 3-D graphic API generating device context (DC) information is provided to the moving picture player.

13. An apparatus using a processor to insert a non-three-dimensional (3-D) moving picture into a three-dimensional (3-D) space, the apparatus comprising:
   a memory;
   a moving picture playing module, executable by the processor, configured to call a moving picture player to play the moving picture data, and capture frame image data of moving picture data by using the moving picture player;
   a moving picture drawing memory, executable by the processor, configured to draw the captured frame image data on a memory area at a time interval by using the moving picture player and determine coordinate information of a texture of the captured frame image data corresponding to coordinate information of 3-D picture data, the coordinate information comprising insertion coordinate information texture is to be inserted by using indication information of the memory area where the frame capture image is drawn;
   a moving picture insertion module, executable by the processor, configured to render the texture of the captured frame image data corresponding to a 3-D coordinate area of the 3-D space cooperating with a 3-D graphic API; and
   a 3-D engine, executable by the processor, configured to:
      display graphic part related with user's view field among graphic drawn in 3D world on user display device, and
      transform coordinate information associated with an occurrence of a user event within the moving picture player into the coordinate information of the moving picture player to change the moving picture in response to the user event,
   wherein 3-D graphic API generating device context (DC) information is provided to the moving picture player.

14. An apparatus, comprising:
   a processor configured to receive a script of moving picture data to be inserted into a space of a 3-D application, the script being controlled by a user interface,
   wherein the processor is configured to call a moving picture player to play the moving picture data and capture frame image data, to draw the captured frame image data on a memory area at a time interval by using the moving picture player, and to set coordinate information of a texture of the captured frame image data corresponding to coordinate information of 3-D picture data,
   wherein the captured frame image data is inserted into a 3-D coordinate area using the same time interval of a 3-D space of the 3-D application being updated,
   wherein the processor is further configured to load a texture to be inserted into a three-dimensional (3-D) space by using indication information of the memory area where the frame capture image is drawn and to render the texture of the captured frame image data to the 3-D coordinated area cooperating with a 3-D graphic API and configured to transform coordinate information associated with an occurrence of a user event into the coordinate information of the moving picture player to change the moving picture in response to the user event, and
   wherein 3-D graphic API generating device context (DC) information is provided to the moving picture player.

* * * * *